United States Patent
Inoue et al.

(10) Patent No.: US 10,605,972 B2
(45) Date of Patent: Mar. 31, 2020

(54) LONG FILM AND METHOD FOR PRODUCING SAME

(71) Applicant: ZEON CORPORATION, Chiyoda-ku, Tokyo (JP)

(72) Inventors: Kyosuke Inoue, Tokyo (JP); Hiromu Mashima, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 15/738,777

(22) PCT Filed: Jun. 29, 2016

(86) PCT No.: PCT/JP2016/069304
§ 371 (c)(1),
(2) Date: Dec. 21, 2017

(87) PCT Pub. No.: WO2017/002868
PCT Pub. Date: Jan. 5, 2017

(65) Prior Publication Data
US 2018/0180787 A1 Jun. 28, 2018

(30) Foreign Application Priority Data

Jun. 30, 2015 (JP) .................. 2015-131101

(51) Int. Cl.
| | | |
|---|---|---|
| G02B 5/30 | (2006.01) | |
| B29C 48/08 | (2019.01) | |
| B29C 48/00 | (2019.01) | |
| B29C 48/91 | (2019.01) | |
| B29C 55/08 | (2006.01) | |
| C08G 61/08 | (2006.01) | |
| C08J 5/18 | (2006.01) | |
| G02B 1/04 | (2006.01) | |
| B29D 11/00 | (2006.01) | |
| B29K 9/00 | (2006.01) | |

(52) U.S. Cl.
CPC ........ *G02B 5/3083* (2013.01); *B29C 48/0018* (2019.02); *B29C 48/022* (2019.02); *B29C 48/08* (2019.02); *B29C 48/91* (2019.02); *B29C 55/08* (2013.01); *C08G 61/08* (2013.01); *C08J 5/18* (2013.01); *G02B 1/04* (2013.01); *B29D 11/00788* (2013.01); *B29K 2009/00* (2013.01); *B29K 2995/0032* (2013.01); *B29K 2995/0093* (2013.01); *C08G 2261/11* (2013.01); *C08G 2261/228* (2013.01); *C08G 2261/3325* (2013.01); *C08G 2261/90* (2013.01); *C08J 2347/00* (2013.01)

(58) Field of Classification Search
CPC .................................................... G02B 5/3083
USPC ......................................................... 428/220
See application file for complete search history.

(56) References Cited

U.S. PATENT DOCUMENTS

| | | | |
|---|---|---|---|
| 6,916,440 B2 | 7/2005 | Jackson et al. | |
| 6,939,499 B2 | 9/2005 | Merrill et al. | |
| 7,229,271 B2 | 6/2007 | Merrill et al. | |
| 7,740,470 B2 | 6/2010 | Merrill et al. | |
| 8,623,472 B2* | 1/2014 | Sasada ............. | B29C 41/28 264/291 |
| 9,144,935 B2 | 9/2015 | Maki et al. | |
| 9,314,961 B2 | 4/2016 | Merrill et al. | |
| 2003/0020208 A1* | 1/2003 | Tasaka ............. | B29C 41/24 264/217 |
| 2006/0226561 A1* | 10/2006 | Merrill ............. | B29C 55/08 264/1.34 |
| 2009/0326190 A1 | 12/2009 | Merrill et al. | |
| 2010/0245730 A1* | 9/2010 | Nimura ............ | B29C 55/14 349/96 |
| 2013/0123459 A1 | 5/2013 | Merrill et al. | |
| 2015/0210023 A1 | 7/2015 | Merrill et al. | |
| 2016/0229111 A1 | 8/2016 | Merrill et al. | |

FOREIGN PATENT DOCUMENTS

| | | | |
|---|---|---|---|
| CN | 101180554 A | 5/2008 | |
| EP | 2278362 A1 * | 1/2011 | ............ B29C 55/08 |
| EP | 2278362 A1 | 1/2011 | |
| JP | 2013151162 A | 8/2013 | |
| JP | 5503975 B2 | 5/2014 | |
| JP | 2014221550 A | 11/2014 | |
| TW | 200702147 A | 1/2007 | |

OTHER PUBLICATIONS

Jan. 2, 2018, International Preliminary Report on Patentability issued in the International Patent Application No. PCT/JP2016/069304.
Feb. 22, 2019, the Extended European Search Report issued by the European Patent Office in the corresponding European Patent Application No. 16817976.0.

* cited by examiner

*Primary Examiner* — Tahseen Khan
(74) *Attorney, Agent, or Firm* — Kenja IP Law PC

(57) ABSTRACT

A long-length film formed of a resin containing a polymer having crystailizability, wherein the long-length film has an orientation axis perpendicular to a long side direction of the long-length film, the long-length film has an Nz factor Nz1 satisfying (formula 1), the long-length film has a birefringence Δn satisfying (formula 2), and the polymer has a crystallization degree X satisfying (formula 3):

$1.0 \leq Nz1 \leq 1.15$ (formula 1)

$0.01 \leq \Delta n \leq 0.1$ (formula 2)

$15\% \leq X$ (formula 3).

5 Claims, No Drawings

LONG FILM AND METHOD FOR PRODUCING SAME

FIELD

The present invention relates to a long-length film and a method for producing the same.

BACKGROUND

Various optical films are provided to image display devices such as liquid crystal display devices and organic electroluminescent display devices. For example, a phase difference film is sometimes provided to an image display device for achieving optical compensation of a displayed image. The optical film such as the phase difference film is produced by, for example, stretching a primary film formed of a resin to obtain a long-length film, and cutting the long-length film to a desired size (see Patent Literatures 1 to 3).

CITATION LIST

Patent Literature

Patent Literature 1: Japanese Patent Application Laid-Open No. 2013-151162 A
Patent Literature 2: Japanese Patent No. 5503975 B
Patent Literature 3: Japanese Patent Application Laid-Open No. 2014-221550 A

SUMMARY

Technical Problem

The aforementioned optical film is sometimes required to have an Nz factor that is close to 1.0. An optical film having an Nz factor that is close to 1.0 can be produced by, for example, subjecting a primary film to a free uniaxial stretching treatment. Here, the free uniaxial stretching treatment refers to a stretching treatment in one direction without the application of a constraint force in directions other than the stretching direction.

Such a free uniaxial stretching treatment is generally performed by a longitudinal uniaxial stretching treatment in which a long-length primary film is stretched in a lengthwise direction. However, since a constraint force is not applied in a film width direction in the longitudinal uniaxial stretching treatment, the width of the film shrinks. Therefore, it is difficult to produce an optical film having a wide film width. Consequently, production efficiency has not been high.

An example of a method for producing an optical film having a wide film width with high production efficiency may be a stretching treatment using a tenter device. The stretching treatment using a tenter device is generally performed by gripping both ends of a primary film with grippers of the tenter device and pulling the primary film. However, since the stretching treatment using a tenter device usually has biaxiality, and a constraint force is applied to the primary film also in a direction other than the stretching direction, it is difficult to achieve an Nz factor close to 1.0. In this respect, Patent Literatures 1 to 3 describe that an optical film having an Nz factor close to 1.0 can be produced. However, the methods described in Patent Literatures 1 to 3 requires a stretching device having a special structure which raises introduction costs. Accordingly, there has been demanded a development of an optical film having an Nz factor close to 1.0 which can be produced by a production method different from the known method.

In view of such demand, the inventor conducted research. As a result, it was found that, when a stretching treatment is performed at a large stretching factor, an optical film having an Nz factor close to 1.0 can be produced by the stretching treatment using a tenter stretching machine. However, when the stretching factor is raised, a birefringence $\Delta n$ of the produced optical film becomes excessively large. An optical film having an excessively large birefringence $\Delta n$ is generally required to be thinned in order to obtain desired optical properties. However, such an optical film which has a large birefringence $\Delta n$ and is thin tends to be largely influenced by the fluctuation in thickness. Therefore, it is difficult to control optical properties such as retardation. Consequently, performance as an optical film is likely to decrease.

The present invention has been devised in view of the aforementioned problem. An object of the present invention is to provide: a long-length film having an Nz factor close to 1.0 which can be produced by a novel production method different from the known method and can be used as an optical film; and a method for producing the same.

Solution to Problem

The present inventor has intensively conducted studies in order to solve the aforementioned problem, and as a result, the present inventor has found that a long-length film having an Nz factor close to 1.0 which can be used as an optical film can be produced by a production method which includes the steps of: subjecting a long-length primary film formed of a resin containing a polymer having crystallizability to a stretching treatment in a width direction, and thereafter subjecting the film to a heating treatment. Thus, the present invention has been accomplished.

That is, the present invention is as follows.

(1) A long-length film formed of a resin containing a polymer having crystallizability, wherein
the long-length film has an orientation axis perpendicular to a long side direction of the long-length film,
the long-length film has an Nz factor Nz1 satisfying (formula 1),
the long-length film has a birefringence $\Delta n$ satisfying (formula 2), and
the polymer has a crystallization degree X satisfying (formula 3):

$$1.0 \leq Nz1 \leq 1.15 \qquad \text{(formula 1)}$$

$$0.01 \leq \Delta n \leq 0.1 \qquad \text{(formula 2)}$$

$$15\% \leq X \qquad \text{(formula 3)}.$$

(2) The long-length film according to (1), wherein the resin has a water absorption of 0.1% or less.
(3) The long-length film according to (1) or (2), wherein the polymer is an alicyclic structure-containing polymer.
(4) The long-length film according to any one of (1) to (3), wherein the long-length film has a thickness of 1 μm or more and 100 μm or less.
(5) A method for producing a long-length film, comprising:
a first step of subjecting a long-length primary film formed of a resin containing a polymer having crystallizability to a stretching treatment in a width direction to obtain a stretched film having an Nz factor of Nz2; and
a second step of subjecting the stretched film obtained in the first step to a heating treatment to obtain a long-length film having an Nz factor of Nz1, wherein a difference ΔNz between the Nz factor Nz2 of the stretched film and the Nz factor Nz1 of the long-length film satisfies (formula 4), the Nz factor Nz1 of the long-length film satisfies (formula 1), the long-length film has a birefringence Δn satisfying (formula 2), and the polymer contained in the long-length film has a crystallization degree X satisfying (formula 3):

$$0.05 \leq \Delta Nz \leq 0.5 \quad \text{(formula 4)}$$

$$1.0 \leq Nz1 \leq 1.15 \quad \text{(formula 1)}$$

$$0.01 \leq \Delta n \leq 0.1 \quad \text{(formula 2)}$$

$$15\% \leq X \quad \text{(formula 3)}.$$

Advantageous Effects of Invention

According to the present invention, there can be provided: a long-length film having an Nz factor close to 1.0 which can be produced by a novel production method different from the known method and can be used as an optical film; and a method for producing the same.

DESCRIPTION OF EMBODIMENTS

Hereinafter, the present invention will be described in detail by illustrating embodiments and examples. However, the present invention is not limited to the embodiments and examples described below. The present invention may be freely modified for implementation without departing from the scope of claims of the present invention and its equivalents.

In the following description, a "long-length" film means a film having a length that is 5 or more times, and preferably 10 or more times the width, and specifically means a film having a length that allows a film to be wound up into a roll shape for storage or transport. The upper limit of the length of the long-length film is not particularly limited, and may be 100,000 or less times the width.

In the following description, the "long side direction" of the long-length film means a direction in which the long side of the film extends. This long side direction usually coincides with the lengthwise direction of the film and is perpendicular to the width direction of the film. This long side direction is usually parallel to the film conveyance direction in the production line.

In the following description, a retardation Re in an in-plane direction of a long-length film is a value represented by "Re=(nx−ny)×d", a retardation Rth in a thickness direction of a long-length film is a value represented by "Rth=[{(nx+ny)/2}−nz]×d", an Nz factor Nz of a long-length film is a value represented by "Nz=(nx−nz)/(nx−ny)=Rth/Re+0.5", and a birefringence Δn of a long-length film is a value represented by "Δn=nx−ny", unless otherwise stated. Here, nx represents a refractive index in, among directions that is perpendicular to the thickness direction of the long-length film (in-plane directions), a direction that gives the largest refractive index. ny represents a refractive index in a direction that is perpendicular to the direction of nx among the in-plane directions of the long-length film. nz represents a refractive index in the thickness direction of the long-length film. d represents the thickness of the long-length film. The measurement wavelength is 590 nm, unless otherwise stated.

In the following description, when the direction of an element is "parallel", "perpendicular" and "orthogonal", an error may be allowed within the range that does not impair the effects of the present invention, for example, in the range of ±5°, unless otherwise stated.

[1. Summary of Long-Length Film]

The long-length film according to the present invention is a long-length film formed of a resin containing a polymer having crystallizability. In the following description, the resin containing a polymer having crystallizability is sometimes referred to as a "crystallizable resin". The long-length film according to the present invention has an orientation axis which is perpendicular to the long side of the long-length film. Here, the orientation axis refers to an orientation axis of molecules of the polymer having crystallizability that is contained in the long-length film.

Furthermore, an Nz factor Nz1 of the long-length film according to the present invention satisfies the following (formula 1), the birefringence Δn of the long-length film according to the present invention satisfies the following (formula 2), and a crystallization degree X of the aforementioned polymer having crystallizability satisfies (formula 3):

$$1.0 \leq Nz1 \leq 1.15 \quad \text{(formula 1)}$$

$$0.01 \leq \Delta n \leq 0.1 \quad \text{(formula 2)}$$

$$15\% \leq X \quad \text{(formula 3)}.$$

[2. Crystallizable Resin]

The crystallizable resin contained in the long-length film is a resin which contains a polymer having crystallizability. The polymer having crystallizability means a polymer having a melting point. The polymer having a melting point means a polymer of which a melting point can be observed using a differential scanning calorimeter (DSC).

As the crystallizable resin, a resin having a positive intrinsic birefringence value is usually used. Therefore, as the polymer having crystallizability, a polymer having a positive intrinsic birefringence value is preferably used. Here, the resin and polymer having a positive intrinsic birefringence value refer to a resin and polymer in which the refractive index in a stretching direction is larger than the refractive index in a direction orthogonal to the stretching direction. The resin and polymer having a negative intrinsic birefringence value refer to a resin and polymer in which the refractive index in a stretching direction is smaller than the refractive index in a direction orthogonal to the stretching direction.

As the aforementioned polymer having crystallizability, an alicyclic structure-containing polymer having crystallizability is preferable. The alicyclic structure-containing polymer is a polymer having an alicyclic structure in its molecule obtained through a polymerization reaction using a cyclic olefin as a monomer, or a hydrogenated product of the polymer. Since the alicyclic structure-containing polymer having crystallizability is excellent in heat resistance and low hygroscopicity, a long-length film suitable for an optical film can be achieved. As the alicyclic structure-containing polymer, one type thereof may be solely used, and two or more types thereof may also be used in combination at any ratio.

Examples of the alicyclic structure possessed by the alicyclic structure-containing polymer may include a cycloalkane structure and a cycloalkene structure. Of these, a cycloalkane structure is preferable, because therewith a long-length film having excellent properties such as thermal stability can be easily obtained. The number of carbon atoms contained in one alicyclic structure is preferably 4 or more, and more preferably 5 or more, and is preferably 30 or less, more preferably 20 or less, and particularly preferably 15 or less. When the number of carbon atoms contained in one alicyclic structure falls within the aforementioned range, mechanical strength, heat resistance, and moldability are highly balanced.

The ratio of the structural unit having an alicyclic structure relative to all structural units in the alicyclic structure-containing polymer is preferably 30% by weight or more, more preferably 50% by weight or more, and particularly preferably 70% by weight or more. When the ratio of the structural unit having an alicyclic structure in the alicyclic structure-containing polymer is at a high level as previously described, heat resistance can be enhanced.

The remainder other than the structural unit having an alicyclic structure in the alicyclic structure-containing polymer is not particularly limited, and may be appropriately selected in accordance with the purposes of use.

Examples of the aforementioned alicyclic structure-containing polymer may include the following polymer ($\alpha$) to polymer ($\delta$). Of these, the polymer ($\beta$) is preferable as the crystallizable alicyclic structure-containing polymer, because therewith a long-length film having excellent heat resistance can be easily obtained:

Polymer ($\alpha$): a ring-opening polymer of a cyclic olefin monomer, having crystallizability Polymer ($\beta$): a hydrogenated product of polymer ($\alpha$), having crystallizability Polymer ($\gamma$): an addition polymer of a cyclic olefin monomer, having crystallizability Polymer ($\delta$): a hydrogenated product of polymer ($\gamma$), having crystallizability.

Specifically, the alicyclic structure-containing polymer is more preferably a crystallizable ring-opening polymer of dicyclopentadiene and a crystallizable hydrogenated product of the ring-opening polymer of dicyclopentadiene, and particularly preferably a crystallizable hydrogenated product of the ring-opening polymer of dicyclopentadiene. Here, the ring-opening polymer of dicyclopentadiene means a polymer in which the ratio of a dicyclopentadiene-derived structural unit relative to all structural units is usually 50% by weight or more, preferably 70% by weight or more, more preferably 90% by weight or more, and further preferably 100% by weight.

Hereinafter, a method for producing the polymer ($\alpha$) and the polymer ($\beta$) will be described.

The cyclic olefin monomer usable for producing the polymer ($\alpha$) and the polymer ($\beta$) is a compound which has a ring structure formed with carbon atoms and includes a carbon-carbon double bond on the ring. Examples of the cyclic olefin monomer may include a norbornene-based monomer. When the polymer ($\alpha$) is a copolymer, a single-ring cyclic olefin may be used as the cyclic olefin monomer.

The norbornene-based monomer is a monomer that contains a norbornene ring. Examples of the norbornene-based monomer may include: a bicyclic monomer such as bicyclo [2.2.1]hept-2-ene (common name: norbornene), and 5-ethylidene-bicyclo[2.2.1]hept-2-ene (common name: ethylidene norbornene) and a derivative thereof (for example, with a substituent on the ring); a tricyclic monomer such as tricyclo[4.3.0.1$^{2,5}$]dec-3,7-diene (common name: dicyclopentadiene) and a derivative thereof; and a tetracyclic monomer such as 7,8-benzotricyclo[4.3.0.1$^{2,5}$]dec-3-ene (common name: methanotetrahydrofluorene: also referred to as 1,4-methano-1,4,4a,9a-tetrahydrofluorene) and a derivative thereof, tetracyclo[4.4.0.1$^{2,5}$.1$^{7,10}$]dodeca-3-ene (common name: tetracyclododecene), and 8-ethylidene tetracyclo [4.4.0.1$^{2,5}$.1$^{7,10}$]-3-dodecene and a derivative thereof.

Examples of the substituent of the aforementioned monomer may include: an alkyl group such as a methyl group and an ethyl group; an alkenyl group such as a vinyl group; an alkylidene group such as propane-2-ylidene; an aryl group such as a phenyl group; a hydroxy group; an acid anhydride group; a carboxyl group; and an alkoxycarbonyl group such as a methoxycarbonyl group. The monomer may solely contain one type of the aforementioned substituents, and may also contain two or more thereof in combination at any ratio.

Examples of the single-ring cyclic olefin may include: cyclic monoolefin such as cyclobutene, cyclopentene, methylcyclopentene, cyclohexene, methylcyclohexene, cycloheptene, and cyclooctene; and cyclic diolefin such as cyclohexadiene, methylcyclohexadiene, cyclooctadiene, methylcyclooctadiene, and phenylcyclooctadiene.

As the cyclic olefin monomer, one type thereof may be solely used, and two or more types thereof may also be used in combination at any ratio. When two or more types of the cyclic olefin monomers are used, the polymer ($\alpha$) may be a block copolymer, or may be a random copolymer.

The cyclic olefin monomer may have a structure with which endo and exo stereoisomers may exist. As the cyclic olefin monomer, any one of the endo isomer and the exo isomer may be used. One of the endo isomer and the exo isomer may solely be used. Alternatively, an isomer mixture which contains the end isomer and the exo isomer at any ratio may also be used. In particular, it is preferable that the ratio of one stereoisomer is made higher than that of the other stereoisomer, because thereby the crystallizability of the alicyclic structure-containing polymer is increased, and a long-length film having more excellent heat resistance can be obtained. For example, the ratio of the endo isomer or the exo isomer is preferably 80% or more, more preferably 90% or more, and further preferably 95% or more. Since synthesis is facilitated, it is preferable that the ratio of the endo isomer is higher.

The crystallizability of the polymer ($\alpha$) and the polymer ($\beta$) can be usually enhanced by increasing the degree of syndiotactic stereoregularity (the ratio of a racemo•diad). From the viewpoint of increasing the level of the stereoregularity of the polymer ($\alpha$) and the polymer ($\beta$), the ratio of a racemo•diad relative to structural units of the polymer ($\alpha$) and the polymer ($\beta$) is preferably 51% or more, more preferably 60% or more, and particularly preferably 70% or more.

The ratio of a racemo•diad may be measured by $^{13}$C-NMR spectrum analysis. Specifically, the ratio may be measured by the following method.

The $^{13}$C-NMR measurement of a polymer sample is performed by applying an inverse-gated decoupling method at 200° C. with ortho-dichlorobenzene-d$^4$ as a solvent. From the result of this $^{13}$C-NMR measurement, a signal at 43.35 ppm derived from a meso•diad and a signal at 43.43 ppm derived from a racemo•diad were identified with a peak at 127.5 ppm of ortho-dichlorobenzene-d$^4$ as a reference shift, and the ratio of a racemo•diad of the polymer sample may be calculated on the basis of the intensity ratio thereof.

For the synthesis of the polymer ($\alpha$), a ring-opening polymerization catalyst is usually used. As the ring-opening polymerization catalyst, one type thereof may be solely used, and two or more types thereof may also be used in combination at any ratio. As such a ring-opening polymerization catalyst for the synthesis of the polymer ($\alpha$), a ring-opening polymerization catalyst with which a cyclic olefin monomer can be subjected to a ring-opening polymerization to generate a ring-opening polymer having syndiotactic stereoregularity is preferable. Examples of the preferable ring-opening polymerization catalyst may include a ring-opening polymerization catalyst which contains a metal compound represented by the following formula (A):

(in the formula (A),

M represents a metal atom selected from the group consisting of transition metal atoms of Group 6 in the periodic table, $R^1$ represents a phenyl group optionally having a substituent at at least one position of the 3-position, 4-position and 5-position, or a group represented by $-CH_2R^3$ ($R^3$ represents a group selected from the group consisting of a hydrogen atom, an alkyl group optionally having a substituent, and an aryl group optionally having a substituent), $R^2$ represents a group selected from the group consisting of an alkyl group optionally having a substituent and an aryl group optionally having a substituent, X represents a group selected from the group consisting of a halogen atom, an alkyl group optionally having a substituent, an aryl group optionally having a substituent, and an alkylsilyl group, L represents an electron-donating neutral ligand, a represents a number of 0 or 1, and b represents an integer of 0 to 2).

In the formula (A), M represents a metal atom selected from the group consisting of transition metal atoms of Group 6 in the periodic table. M is preferably chromium, molybdenum and tungsten, more preferably molybdenum and tungsten, particularly preferably tungsten.

In the formula (A), $R^1$ represents a phenyl group optionally having a substituent at at least one position of the 3-position, 4-position and 5-position, or a group represented by $-CH_2R^3$.

The number of carbon atoms in the phenyl group optionally having a substituent at at least one position of the 3-position, 4-position and 5-position of $R^1$ is preferably 6 to 20, and more preferably 6 to 15. Examples of the substituent may include an alkyl group such as a methyl group and an ethyl group; a halogen atom such as a fluorine atom, a chlorine atom, and a bromine atom; and an alkoxy group such as a methoxy group, an ethoxy group, and an isopropoxy group. As the substituent, the metal compound may solely have one type thereof, and may also have two or more types thereof in combination at any ratio. Furthermore, in $R^1$, the substituents present at at least two positions of the 3-position, 4-position and 5-position may be bonded with each other to form a ring structure.

Examples of the phenyl group optionally having a substituent at at least one position of the 3-position, 4-position and 5-position may include: an unsubstituted phenyl group; a monosubstituted phenyl group such as a 4-methylphenyl group, a 4-chlorophenyl group, a 3-methoxyphenyl group, a 4-cyclohexylphenyl group, and a 4-methoxyphenyl group; a disubstituted phenyl group such as a 3,5-dimethylphenyl group, a 3,5-dichlorophenyl group, a 3,4-dimethylphenyl group, and a 3,5-dimethoxyphenyl group; a trisubstituted phenyl group such as a 3,4,5-trimethylphenyl group and a 3,4,5-trichlorophenyl group; and a 2-naphthyl group optionally having a substituent such as a 2-naphthyl group, a 3-methyl-2-naphthyl group, and a 4-methyl-2-naphthyl group.

In the group represented by $-CH_2R^3$ of $R^1$, $R^3$ represents a group selected from the group consisting of a hydrogen atom, an alkyl group optionally having a substituent, and an aryl group optionally having a substituent.

The number of carbon atoms in the alkyl group optionally having a substituent of $R^3$ is preferably 1 to 20, and more preferably 1 to 10. This alkyl group may be linear or branched. Furthermore, examples of the substituent may include: a phenyl group, and a phenyl group optionally having a substituent such as a 4-methylphenyl group; and an alkoxyl group such as a methoxy group and an ethoxy group. As the substituent, one type thereof may be solely used, and two or more types thereof may also be used in combination at any ratio.

Examples of the alkyl group optionally having a substituent of $R^3$ may include a methyl group, an ethyl group, a propyl group, an isopropyl group, a butyl group, an isobutyl group, a t-butyl group, a pentyl group, a neopentyl group, a benzyl group, and a neophyl group.

The number of carbon atoms in the aryl group optionally having a substituent of $R^3$ is preferably 6 to 20, and more preferably 6 to 15. Furthermore, examples of the substituent may include: an alkyl group such as a methyl group and an ethyl group; a halogen atom such as a fluorine atom, a chlorine atom, and a bromine atom; and an alkoxy group such as a methoxy group, an ethoxy group, and an isopropoxy group. As the substituent, one type thereof may be solely used, and two or more types thereof may also be used in combination at any ratio.

Examples of the aryl group optionally having a substituent of $R^3$ may include a phenyl group, a 1-naphthyl group, a 2-naphthyl group, a 4-methylphenyl group, and a 2,6-dimethylphenyl group.

Of these, as the group represented by $R^3$, an alkyl group of 1 to 20 carbon atoms is preferable.

In the formula (A), $R^2$ represents a group selected from the group consisting of an alkyl group optionally having a substituent and an aryl group optionally having a substituent. The alkyl group optionally having a substituent and the aryl group optionally having a substituent of $R^2$ may be freely selected from the ranges shown as the alkyl group optionally having a substituent and the aryl group optionally having a substituent of $R^3$, respectively.

In the formula (A), X represents a group selected from the group consisting of a halogen atom, an alkyl group optionally having a substituent, an aryl group optionally having a substituent, and an alkylsilyl group.

Examples of the halogen atom of X may include a chlorine atom, a bromine atom, and an iodine atom.

The alkyl group optionally having a substituent and the aryl group optionally having a substituent of X may be freely selected from the ranges shown as the alkyl group optionally having a substituent and the aryl group optionally having a substituent of $R^3$, respectively.

Examples of the alkylsilyl group of X may include a trimethylsilyl group, a triethylsilyl group, and a t-butyldimethylsilyl group.

When the metal compound represented by the formula (A) has two or more X's in one molecule, those X's may be the same as or different from each other. Furthermore, the two or more X's may be bonded with each other to form a ring structure.

In the formula (A), L represents an electron-donating neutral ligand.

Examples of the electron-donating neutral ligand of L may include an electron-donating compound which contains an atom of Group 14 or 15 in the periodic table. Specific examples thereof may include: phosphines such as trimethyl phosphine, triisopropyl phosphine, tricyclohexyl phosphine, and triphenyl phosphine; ethers such as diethyl ether, dibutyl ether, 1,2-dimethoxyethane, and tetrahydrofuran; and amines such as trimethylamine, triethylamine, pyridine, and lutidine. Of these, ethers are preferable. When the metal compound represented by the formula (A) has two or more L's in one molecule, those L's may be the same as or different from each other.

As the metal compound represented by the formula (A), a tungsten compound having a phenylimide group is preferable. That is, a compound of the formula (A) in which M is a tungsten atom, and $R^1$ is a phenyl group, is preferable. Furthermore, among those compounds, a tetrachlorotungsten phenylimide (tetrahydrofuran) complex is more preferable.

The method for producing the metal compound represented by the formula (A) is not particularly limited. For example, the metal compound represented by the formula (A) may be produced, as described in Japanese Patent Application Laid-Open No. Hei. 5-345817 A, by mixing: an oxyhalide of Group 6 transition metal; a phenyl isocyanate optionally having a substituent at least one position of the 3-position, 4-position and 5-position or a monosubstituted methyl isocyanate; an electron-donating neutral ligand (L); and, as necessary, an alcohol, a metal alkoxide, and a metal aryl oxide.

In the aforementioned production method, the metal compound represented by the formula (A) is usually obtained in the state of being contained in a reaction liquid. After the metal compound was produced, the reaction liquid as it is may be used as a catalyst liquid for a ring-opening polymerization reaction. Alternatively, the metal compound may be isolated from the reaction liquid and purified by a purification treatment such as crystallization, and thereafter the isolated metal compound may be used for a ring-opening polymerization reaction.

As the ring-opening polymerization catalyst, the metal compound represented by the formula (A) may be used alone. Alternatively, the metal compound represented by the formula (A) may be used in combination with another component. For example, polymerization activity can be enhanced by using a combination of the metal compound represented by the formula (A) and an organometallic reducing agent.

Examples of the organometallic reducing agent may include an organometallic compound of Group 1, 2, 12, 13, or 14 in the periodic table having a hydrocarbon group of 1 to 20 carbon atoms. Examples of such an organometallic compound may include: organic lithium such as methyllithium, n-butyllithium, and phenyllithium; organic magnesium such as butylethylmagnesium, butyloctylmagnesium, dihexylmagnesium, ethylmagnesium chloride, n-butylmagnesium chloride, and allylmagnesium bromide; organic zinc such as dimethylzinc, diethylzinc, and diphenylzinc; organic aluminum such as trimethylaluminum, triethylaluminum, triisobutylaluminum, diethylaluminum chloride, ethylaluminum sesquichloride, ethylaluminum dichloride, diethylaluminum ethoxide, diisobutylaluminum isobutoxide, ethylaluminum diethoxide, and isobutylaluminum diisobutoxide; and organic tin such as tetramethyltin, tetra(n-butyl)tin, and tetraphenyltin. Of these, organic aluminum or organic tin is preferable. As the organometallic reducing agent, one type thereof may be solely used, and two or more types thereof may also be used in combination at any ratio.

A ring-opening polymerization reaction is usually performed in an organic solvent. The organic solvent to be used may be a solvent that can dissolve or disperse a ring-opening polymer and a hydrogenated product thereof under specific conditions, and does not inhibit the ring-opening polymerization reaction and the hydrogenation reaction. Examples of such an organic solvent may include: an aliphatic hydrocarbon solvent such as pentane, hexane, and heptane; an alicyclic hydrocarbon solvent such as cyclopentane, cyclohexane, methylcyclohexane, dimethylcyclohexane, trimethylcyclohexane, ethylcyclohexane, diethylcyclohexane, decahydronaphthalene, bicycloheptane, tricyclodecane, hexahydroindene, and cyclooctane; an aromatic hydrocarbon solvent such as benzene, toluene, and xylene; a halogen-based aliphatic hydrocarbon solvent such as dichloromethane, chloroform, and 1,2-dichloroethane; a halogen-based aromatic hydrocarbon solvent such as chlorobenzene and dichlorobenzene; a nitrogen-containing hydrocarbon solvent such as nitromethane, nitrobenzene, and acetonitrile; an ether solvent such as diethyl ether and tetrahydrofuran; and a mixed solvent obtained by mixing these solvents. Of these, preferable examples of the organic solvents may include an aromatic hydrocarbon solvent, an aliphatic hydrocarbon solvent, an alicyclic hydrocarbon solvent, and an ether solvent. As the organic solvent, one type thereof may be solely used, and two or more types thereof may also be used in combination at any ratio.

The ring-opening polymerization reaction may be initiated by, for example, mixing a cyclic olefin monomer, the metal compound represented by the formula (A), and, as necessary, an organometallic reducing agent. The mixing order of these components is not particularly limited. For example, a solution containing the metal compound represented by the formula (A) and an organometallic reducing agent may be mixed in a solution containing a cyclic olefin monomer. Alternatively, a solution containing a cyclic olefin monomer and the metal compound represented by the formula (A) may be mixed in a solution containing an organometallic reducing agent. Furthermore, a solution containing the metal compound represented by the formula (A) may be mixed in a solution containing a cyclic olefin monomer and an organometallic reducing agent. When mixing components, the entire amounts of the components may be mixed at once, or the components may be separately mixed over multiple times. Mixing may be continuously performed over a relatively long period of time (for example, 1 minute or more).

The concentration of the cyclic olefin monomer in a reaction liquid when a ring-opening polymerization reaction is initiated is preferably 1% by weight or more, more preferably 2% by weight or more, and particularly preferably 3% by weight or more, and is preferably 50% by weight or less, more preferably 45% by weight or less, and particularly preferably 40% by weight or less. When the concentration of the cyclic olefin monomer is equal to or more than the lower limit value of the aforementioned range, productivity can be increased. When the concentration is equal to or less than the upper limit value, viscosity of the reaction liquid after the ring-opening polymerization reaction can be decreased. Accordingly, a subsequent hydrogenation reaction can be easily performed.

It is desired that the amount of the metal compound represented by the formula (A) used in the ring-opening polymerization reaction is determined such that the molar ratio of "metal compound:cyclic olefin monomer" falls within a specific range. Specifically, the molar ratio is preferably 1:100 to 1:2,000,000, more preferably 1:500 to 1:1,000,000, and particularly preferably 1:1,000 to 1:500,000. When the amount of the metal compound is equal to or more than the lower limit value of the aforementioned range, sufficient polymerization activity can be obtained. When the amount is equal to or less than the upper limit value, the metal compound can be easily removed after the reaction.

The amount of the organometallic reducing agent relative to 1 mol of the metal compound represented by the formula (A) is preferably 0.1 mol or more, more preferably 0.2 mol or more, and particularly preferably 0.5 mol or more, and is preferably 100 mol or less, more preferably 50 mol or less, and particularly preferably 20 mol or less. When the amount of the organometallic reducing agent is equal to or more than the lower limit value of the aforementioned range, polymerization activity can be sufficiently increased. When the amount is equal to or less than the upper limit value, occurrence of a side reaction can be suppressed.

The polymerization reaction system of the polymer (α) may contain an activity adjuster. When the activity adjuster is used, a ring-opening polymerization catalyst can be stabilized, and the reaction rate of a ring-opening polymerization reaction and the molecular weight distribution of a polymer can be adjusted.

As the activity adjuster, an organic compound having a functional group may be used. Examples of such an activity adjuster may include an oxygen-containing compound, a nitrogen-containing compound, and a phosphorous-containing organic compound.

Examples of the oxygen-containing compound may include: ethers such as diethyl ether, diisopropyl ether, dibutyl ether, anisole, furan, and tetrahydrofuran; ketones such as acetone, benzophenone, and cyclohexanone; and esters such as ethyl acetate.

Examples of the nitrogen-containing compound may include: nitriles such as acetonitrile and benzonitrile; amines such as triethylamine, triisopropylamine, quinuclidine, and N,N-diethylaniline; and pyridines such as pyridine, 2,4-lutidine, 2,6-lutidine, and 2-t-butyl pyridine.

Examples of the phosphorous-containing compound may include: phosphines such as triphenyl phosphine, tricyclohexyl phosphine, triphenyl phosphate, and trimethyl phosphate; and phosphine oxides such as triphenyl phosphine oxide.

As the activity adjuster, one type thereof may be solely used, and two or more types thereof may also be used in combination at any ratio.

The amount of the activity adjuster in the polymerization reaction system of the polymer (α) relative to 100 mol % of the metal compound represented by the formula (A) is preferably 0.01 mol % to 100 mol %.

For adjusting the molecular weight of the polymer (α), the polymerization reaction system of the polymer (α) may contain a molecular weight adjuster. Examples of the molecular weight adjuster may include: α-olefins such as 1-butene, 1-pentene, 1-hexene, and 1-octene; an aromatic vinyl compound such as styrene and vinyl toluene; an oxygen-containing vinyl compound such as ethyl vinyl ether, isobutyl vinyl ether, allyl glycidyl ether, allyl acetate, allyl alcohol, and glycidyl methacrylate; a halogen-containing vinyl compound such as allyl chloride; a nitrogen-containing vinyl compound such as acrylamide; non-conjugated diene such as 1,4-pentadiene, 1,4-hexadiene, 1,5-hexadiene, 1,6-heptadiene, 2-methyl-1,4-pentadiene, and 2,5-dimethyl-1,5-hexadiene; and conjugated diene such as 1,3-butadiene, 2-methyl-1,3-butadiene, 2,3-dimethyl-1,3-butadiene, 1,3-pentadiene, and 1,3-hexadiene.

As the molecular weight adjuster, one type thereof may be solely used, and two or more types thereof may also be used in combination at any ratio.

The amount of the molecular weight adjuster in the polymerization reaction system for polymerizing the polymer (α) may be appropriately determined in accordance with an intended molecular weight. The specific amount of the molecular weight adjuster is preferably 0.1 mol % to 50 mol % relative to the cyclic olefin monomer.

The polymerization temperature is preferably −78° C. or higher, and more preferably −30° C. or higher, and is preferably +200° C. or lower, and more preferably +180° C. or lower.

The polymerization time may be dependent on reaction scale. The specific polymerization time is preferably 1 minute to 1000 hours.

By the aforementioned production method, the polymer (α) may be obtained. By hydrogenating this polymer (α), the polymer (β) may be produced.

The hydrogenation of the polymer (α) may be performed by, for example, supplying hydrogen into the reaction system containing the polymer (α) in the presence of a hydrogenation catalyst according to a conventional method. In this hydrogenation reaction, the tacticity of the hydrogenated product is not usually changed by the hydrogenation reaction, with a proviso that the reaction condition is appropriately set.

As the hydrogenation catalyst, a homogeneous catalyst and heterogeneous catalyst that are known as a hydrogenation catalyst of an olefin compound may be used.

Examples of the homogeneous catalyst may include: a catalyst containing a combination of a transition metal compound and an alkali metal compound, such as cobalt acetate/triethylaluminum, nickel acetylacetonate/triisobutylaluminum, titanocene dichloride/n-butyllithium, zirconocene dichloride/sec-butyllithium, and tetrabutoxy titanate/dimethylmagnesium; and a noble metal complex catalyst such as dichlorobis(triphenylphosphine)palladium, chlorohydridocarbonyltris(triphenylphosphine)ruthenium, chlorohydridocarbonylbis(tricyclohexylphosphine)ruthenium, bis(tricyclohexylphosphine)benzylidyne ruthenium(IV) dichloride, and chlorotris(triphenylphosphine)rhodium.

Examples of the heterogeneous catalyst may include: a metal catalyst such as nickel, palladium, platinum, rhodium, and ruthenium; and a solid catalyst in which the aforementioned metal is supported by a carrier such as carbon, silica, diatomaceous earth, alumina, and titanium oxide, such as nickel/silica, nickel/diatomaceous earth, nickel/alumina, palladium/carbon, palladium/silica, palladium/diatomaceous earth, and palladium/alumina.

As the hydrogenation catalyst, one type thereof may be solely used, and two or more types thereof may also be used in combination at any ratio.

The hydrogenation reaction is usually performed in an inactive organic solvent. Examples of the inactive organic solvent may include: an aromatic hydrocarbon solvent such as benzene and toluene; an aliphatic hydrocarbon solvent such as pentane and hexane; an alicyclic hydrocarbon solvent such as cyclohexane and decahydronaphthalene; and an ether solvent such as tetrahydrofuran and ethylene glycol dimethyl ether. As the inactive organic solvent, one type thereof may be solely used, and two or more types thereof may also be used in combination at any ratio. The inactive organic solvent may be the same as or different from the organic solvent used in the ring-opening polymerization reaction. Furthermore, the hydrogenation catalyst may be mixed in the reaction liquid of the ring-opening polymerization reaction for performing the hydrogenation reaction.

The reaction conditions for the hydrogenation reaction usually vary depending on the hydrogenation catalyst used.

The reaction temperature of the hydrogenation reaction is preferably −20° C. or higher, more preferably −10° C. or higher, and particularly preferably 0° C. or higher, and is preferably +250° C. or lower, more preferably +220° C. or lower, and particularly preferably +200° C. or lower. When the reaction temperature is equal to or higher than the lower limit value of the aforementioned range, reaction rate can be increased. When the reaction temperature is equal to or lower than the upper limit value, occurrence of a side reaction can be suppressed.

The hydrogen pressure is preferably 0.01 MPa or more, more preferably 0.05 MPa or more, and particularly preferably 0.1 MPa or more, and is preferably 20 MPa or less, more preferably 15 MPa or less, and particularly preferably 10 MPa or less. When the hydrogen pressure is equal to or more than the lower limit value of the aforementioned range, reaction rate can be increased. When the hydrogen pressure is equal to or less than the upper limit value, a special apparatus such as a highly pressure resistant reaction vessel is not required, and thereby facility costs can be suppressed.

The reaction time of the hydrogenation reaction may be set to any period of time in which a desired hydrogenation ratio is achieved, and preferably 0.1 hour to 10 hours.

After the hydrogenation reaction, the polymer (p), which is the hydrogenated product of the polymer ($\alpha$), is usually collected by a conventional method.

The hydrogenation rate (the ratio of a hydrogenated main-chain double bond) in the hydrogenation reaction is preferably 98% or more, and more preferably 99% or more. As the hydrogenation rate becomes higher, heat resistance of the alicyclic structure-containing polymer can be more favorable.

Here, the hydrogenation rate of the polymer may be measured by a $^1$H-NMR measurement at 145° C., with ortho-dichlorobenzene-d$^4$ as a solvent.

Subsequently, the method for producing the polymer ($\gamma$) and the polymer ($\delta$) will be described.

As the cyclic olefin monomer to be used for producing the polymers ($\gamma$) and ($\delta$), any of those selected from the range shown as the cyclic olefin monomer to be used for producing the polymers ($\alpha$) and ($\beta$) may be used. As the cyclic olefin monomer, one type thereof may be solely used, and two or more types thereof may also be used in combination at any ratio.

In the production of the polymer ($\gamma$), any optional monomer which is polymerizable with a cyclic olefin monomer may be used as a monomer in combination with the cyclic olefin monomer. Examples of the optional monomer may include: $\alpha$-olefin of 2 to 20 carbon atoms such as ethylene, propylene, 1-butene, 1-pentene, and 1-hexene; an aromatic ring vinyl compound such as styrene and $\alpha$-methylstyrene; and non-conjugated diene such as 1,4-hexadiene, 4-methyl-1,4-hexadiene, 5-methyl-1,4-hexadiene, and 1,7-octadiene. Of these, $\alpha$-olefin is preferable, and ethylene is more preferable. As the optional monomer, one type thereof may be solely used, and two or more types thereof may also be used in combination at any ratio.

The ratio between the cyclic olefin monomer and the optional monomer in terms of a weight ratio (cyclic olefin monomer: optional monomer) is preferably 30:70 to 99:1, more preferably 50:50 to 97:3, and particularly preferably 70:30 to 95:5.

When two or more types of cyclic olefin monomers are used, or when the cyclic olefin monomer and the optional monomer are used in combination, the polymer ($\gamma$) may be a block copolymer, or may be a random copolymer.

For the synthesis of the polymer ($\gamma$), an addition polymerization catalyst is usually used. Examples of such an addition polymerization catalyst may include a vanadium-based catalyst formed with a vanadium compound and an organic aluminum compound, a titanium-based catalyst formed with a titanium compound and an organic aluminum compound, and a zirconium-based catalyst formed with a zirconium complex and aluminoxane. As the addition polymerization catalyst, one type thereof may be solely used, and two or more types thereof may also be used in combination at any ratio.

The amount of the addition polymerization catalyst relative to 1 mol of a monomer is preferably 0.000001 mol or more, and more preferably 0.00001 mol or more, and is preferably 0.1 mol or less, and more preferably 0.01 mol or less.

The addition polymerization of the cyclic olefin monomer is usually performed in an organic solvent. As the organic solvent, any of those selected from the range shown as the organic solvent which may be used for the ring-opening polymerization of a cyclic olefin monomer may be used. As the organic solvent, one type thereof may be solely used, and two or more types thereof may also be used in combination at any ratio.

The polymerization temperature in the polymerization for producing the polymer (7) is preferably −50° C. or higher, more preferably −30° C. or higher, and particularly preferably −20° C. or higher, and is preferably 250° C. or lower, more preferably 200° C. or lower, and particularly preferably 150° C. or lower. The polymerization time is preferably 30 minutes or more, and more preferably 1 hour or more, and is preferably 20 hours or less, and more preferably 10 hours or less.

By the aforementioned production method, the polymer ($\gamma$) may be obtained. By hydrogenating this polymer ($\gamma$), the polymer ($\delta$) may be produced.

The hydrogenation of the polymer ($\gamma$) may be performed by a similar method to the method previously described as a method for hydrogenating the polymer ($\alpha$).

The crystallization degree X of the polymer having crystallizability that is contained in the crystallizable resin satisfies the aforementioned (formula 3). The specific range of the crystallization degree X of the polymer having crystallizability is usually 15% or more, preferably 20% or more, and more preferably 25% or more. By promoting crystallization to an extent that such a high crystallization degree X is achieved, the long-length film can have an Nz factor close to 1.0. Furthermore, when the crystallization degree X of the polymer having crystallizability is equal to or more than the lower limit value of the aforementioned range, the long-length film can usually have high heat resistance and chemical resistance. The upper limit of the crystallization degree X of the polymer having crystallizability is not limited, but preferably 70% or less, more preferably 60% or less, and particularly preferably 50% or less. When the crystallization degree X is equal to or less than the aforementioned upper limit value, favorable transparency of the long-length film can be easily achieved.

The crystallization degree of a polymer may be measured by an X-ray diffraction method.

The melting point of the polymer having crystallizability is preferably 200° C. or higher, and more preferably 230° C. or higher, and is preferably 290° C. or lower. When a polymer having such a melting point is used, a long-length film having a further excellent balance between moldability and heat resistance can be obtained.

The weight-average molecular weight (Mw) of the polymer having crystallizability is preferably 1,000 or more, and more preferably 2,000 or more, and is preferably 1,000,000 or less, and more preferably 500,000 or less. The polymer having such a weight-average molecular weight has an excellent balance between molding processability and heat resistance.

The molecular weight distribution (Mw/Mn) of the polymer having crystallizability is preferably 1.0 or more, and more preferably 1.5 or more, and is preferably 4.0 or less, and more preferably 3.5 or less. Here, Mn represents a number-average molecular weight. The polymer having such a molecular weight distribution has an excellent molding processability.

The weight-average molecular weight (Mw) and the molecular weight distribution (Mw/Mn) of the polymer having crystallizability may be measured as a polystyrene equivalent value by gel permeation chromatograph (GPC) using tetrahydrofuran as a development solvent.

The glass transition temperature Tg of the polymer having crystallizability is not particularly limited, and may be in a range of 85° C. or higher and 170° C. or lower.

The ratio of the polymer having crystallizability in the crystallizable resin is preferably 50% by weight or more, more preferably 70% by weight or more, and particularly preferably 90% by weight or more. When the ratio of the polymer having crystallizability is equal to or more than the lower limit value of the aforementioned range, the long-length film can have enhanced heat resistance.

The crystallizable resin may contain an optional component in addition to the polymer having crystallizability. Examples of the optional component may include: an antioxidant such as a phenol-based antioxidant, a phosphorus-based antioxidant, and a sulfur-based antioxidant; a photostabilizer such as a hindered amine-based photostabilizer; wax such as petroleum-based wax, Fischer-Tropsch wax, and polyalkylene wax; a nucleating agent such as a sorbitol-based compound, metal salt of organic phosphoric acid, metal salt of organic carboxylic acid, kaolin, and talc; a fluorescent brightener such as a diaminostilbene derivative, a coumarin derivative, an azole-based derivative (for example, a benzooxazole derivative, a benzotriazole derivative, a benzoimidazole derivative, and a benzotiazole derivative), a carbazole derivative, a pyridine derivative, a naphthalic acid derivative, and an imidazolone derivative; a ultraviolet absorber such as a benzophenone-based ultraviolet absorber, a salicylic acid-based ultraviolet absorber, and a benzotriazole-based ultraviolet absorber; an inorganic filler such as talc, silica, calcium carbonate, and glass fiber; a colorant; a flame retardant; a flame retardant auxiliary; an antistatic agent; a plasticizer; a near-infrared absorber; a lubricant; a filler; and an optional polymer other than the polymer having crystallizability, such as a soft polymer. As the optional component, one type thereof may be solely used, and two or more types thereof may also be used in combination at any ratio.

The aforementioned crystallizable resin usually has low water absorption and therefore has excellent water resistance. In particular, from the viewpoint of size stability, the water absorption of the crystallizable resin is preferably 0.1% or less, more preferably 0.08% or less, and particularly preferably 0.05% or less.

The water absorption of the crystallizable resin may be measured by the following method.

A film-shape test piece formed of a crystallizable resin is prepared, and the weight of the test piece is measured. Thereafter, this test piece is immersed in water at 23° C. for 24 hours, and the weight of the immersed test piece is measured. Then, the ratio of the weight increase of the test piece by the immersion relative to the weight of the test piece before the immersion may be calculated as a water absorption (%).

The aforementioned crystallizable resin is usually excellent in heat resistance. Specifically, the heat-resistant temperature of the crystallizable resin is preferably 180° C. or higher, more preferably 200° C. or higher, and particularly preferably 220° C. or higher. Here, the heat-resistant temperature of the crystallizable resin may be confirmed by the following method.

As a sample, a film formed of a crystallizable resin is prepared. This film is left to stand for 10 minutes under an atmosphere at temperature Tx in a state in which tension is not applied to the film. Thereafter, the surface state of the film is visually observed. When any concave or convex portion is not observed on the surface of the film, the heat-resistant temperature of the crystallizable resin may be judged to be the aforementioned temperature Tx or higher.

[3. Properties of Long-Length Film]

The long-length film according to the present invention has an orientation axis which is perpendicular to the long side direction of the long-length film. Molecules of the polymer having crystallizability that is contained in the long-length film are usually oriented in parallel to the aforementioned orientation axis. This orientation axis may be measured on the basis of the slow axis of the long-length film. Specifically, when the intrinsic birefringence value of the crystallizable resin which forms the long-length film is positive, the direction of the orientation axis of the long-length film is parallel to the slow axis of the long-length film. When the intrinsic birefringence value of the crystallizable resin which forms the long-length film is negative, the direction of the orientation axis of the long-length film is perpendicular to the slow axis of the long-length film.

The Nz factor Nz1 of the long-length film according to the present invention satisfies the aforementioned (formula 1). More specifically, the Nz factor Nz1 of the long-length film is usually 1.15 or less, preferably 1.12 or less, particularly preferably 1.08 or less, and ideally 1.0. The long-length film having such an Nz factor close to 1.0 may be suitably used as an optical film such as an optical compensation film for a liquid crystal display device.

The birefringence Δn of the long-length film according to the present invention satisfies the aforementioned (formula 2). More specifically, the birefringence Δn of the long-length film is usually 0.010 or more, preferably 0.011 or more, more preferably 0.012 or more, and particularly preferably 0.02 or more, and is usually 0.1 or less, preferably 0.07 or less, and more preferably 0.04 or less. When the birefringence Δn of the long-length film is equal to or more than the lower limit value of the aforementioned range, optical properties such as the Nz factor can be confined within a desired range. Furthermore, when the birefringence Δn is equal to or more than the lower limit value of the aforementioned range, thickness of the long-length film having a retardation required for use as a film for a display can be inhibited from becoming excessively thick. Accordingly, the long-length film can have favorable handling properties. When the birefringence Δn is equal to or less than the upper limit value of the aforementioned range, fluctuation in optical properties attributable to the uneven film thickness of the long-length film can be easily suppressed, and a long-length film which causes little light leak can be obtained. When the birefringence Δn is equal to or less than the upper limit value of the aforementioned range, thickness of the long-length film having an appropriate retardation required for use as an optical film can be inhibited from becoming excessively thick. Accordingly, the long-length film can have favorable handling properties.

It is preferable that the long-length film according to the present invention is excellent in transparency. Specifically, the total light transmittance of the long-length film according to the present invention is preferably 70% or more, more preferably 80% or more, and particularly preferably 90% or more. The total light transmittance of the long-length film may be measured using an UV•visible spectrophotometer at a wavelength of 400 nm to 700 nm.

It is preferable that the haze of the long-length film according to the present invention is low. Specifically, the haze of the long-length film according to the present invention is preferably 10% or less, more preferably 5% or less, and particularly preferably 3% or less. The haze of the long-length film may be measured by cutting the long-length film at a randomly-selected site to obtain a thin film sample of 50 mm×50 mm-square, and thereafter measuring the haze of the thin film sample using a haze meter.

The long-length film according to the present invention has a retardation. For example, when the long-length film according to the present invention is used as an optical film such as a phase difference film and an optical compensation film, the long-length film according to the present invention has a retardation.

[4. Thickness of Long-Length Film]

The thickness of the long-length film according to the present invention may be set in accordance with its use, and is preferably 1 μm or more, more preferably 3 μm or more, and particularly preferably 5 μm or more, and is preferably 100 μm or less, more preferably 50 μm or less, and particularly preferably 25 μm or less. When the thickness of the long-length film is equal to or more than the lower limit value of the aforementioned range, the long-length film can have enhanced mechanical strength. Also, when the thickness of the long-length film is equal to or more than the lower limit value of the aforementioned range, the long-length film can have favorable handling properties. When the thickness of the long-length film is equal to or less than the upper limit value of the aforementioned range, take-up operation during the production of the long-length film is facilitated. Furthermore, when the thickness of the long-length film is equal to or less than the upper limit value of the aforementioned range, excessive increase of the retardation can be suppressed. Accordingly, the long-length film can be suitably used as an optical film such as a phase difference film.

[5. Method for Producing Long-Length Film]

The long-length film according to the present invention may be produced by a production method including: a first step of subjecting a long-length primary film formed of a crystallizable resin to a stretching treatment in a width direction to obtain a stretched film having an Nz factor of Nz2; and a second step of subjecting the stretched film obtained in the first step to a heating treatment to obtain the long-length film according to the present invention having an Nz factor of Nz1. In this production method, the stretched film is obtained by the stretching treatment in a width direction. Accordingly, a long-length film having a wide width is easily produced. Therefore, a desired long-length film can be efficiently produced. Since a desired long-length film can be produced by a simple operation that is heating after stretching, a stretching device having a specialized structure does not need to be prepared. Thus, the introduction cost can be reduced. Hereinafter, this production method will be described.

<5.1. Preparation of Primary Film>

In this method for producing the long-length film, a step of preparing a primary film is performed. The primary film is a film formed of a crystallizable resin. Examples of the method for producing the primary film formed of a crystallizable resin may include an injection molding method, an extrusion molding method, a press molding method, an inflation molding method, a blow molding method, a calendar molding method, a cast molding method, and a compression molding method. Of these, an extrusion molding method is preferable, because therewith thickness control can be easily performed.

When producing the primary film by an extrusion molding method, preferable production conditions in the extrusion molding method are as follows. The cylinder temperature (molten resin temperature) is preferably Tm or higher, and more preferably Tm+20° C. or higher, and is preferably Tm+100° C. or lower, and more preferably Tm+50° C. or lower. The casting roll temperature is preferably Tg−50° C. or higher, and is preferably Tg+70° C. or lower, and more preferably Tg+40° C. or lower. Furthermore, the cooling roll temperature is preferably Tg−70° C. or higher, and more preferably Tg−50° C. or higher, and is preferably Tg+60° C. or lower, and more preferably Tg+30° C. or lower. By producing the primary film under such conditions, a primary film having a desired thickness can be easily produced. Here, "Tm" represents the melting point of the polymer having crystallizability that is contained in the crystallizable resin, and "Tg" represents the glass transition temperature of the polymer having crystallizability.

The thickness of the primary film may be freely set in accordance with the thickness of the long-length film to be produced, and is preferably 5 μm or more, more preferably 10 μm or more, and particularly preferably 20 μm or more, and is preferably 1 mm or less, more preferably 500 μm or less, further preferably 400 μm or less, and particularly preferably 200 μm or less.

<5.2. First Step: Stretching Step>

After the primary film was prepared, a first step in which the primary film is subjected to a stretching treatment in a width direction to obtain a stretched film is performed. Since the stretching treatment is performed only in one direction that is in a width direction, this stretching method is called a transverse uniaxial stretching method. As this transverse uniaxial stretching method, a stretching method using a tenter stretching machine, for example, may be used.

The stretching temperature when stretching the primary film in the first step is preferably (Tg−30° C.) or higher, and more preferably (Tg−10° C.) or higher, and is preferably (Tg+60° C.) or lower, and more preferably (Tg+50° C.) or lower. When stretching is performed within such a temperature range, polymer molecules contained in the primary film can be appropriately oriented.

The stretching factor for stretching the primary film may be appropriately selected in accordance with elements such as desired optical properties, thickness, and strength. The specific stretching factor is preferably 1.25 times or more, more preferably 1.7 times or more, and particularly preferably 2.0 times or more, and is preferably 5.0 times or less, more preferably 4.5 times or less, and particularly preferably 4.0 times or less. When the stretching factor falls within the aforementioned range, polymer molecules contained in the primary film can be appropriately oriented. When the stretching factor is equal to or more than the lower limit value of the aforementioned range, excessive increase of the value of the Nz factor Nz2 of the stretched film can be suppressed. Accordingly, the Nz factor Nz1 of the long-length film can be easily confined within a desired range. Furthermore, when the stretching factor is equal to or less than the upper limit value of the aforementioned range, excessive increase of the birefringence Δn can be suppressed. Accordingly, accuracy of retardation can be favorable, and break during stretching can be effectively suppressed.

By subjecting the primary film to the aforementioned stretching treatment, a stretched film can be obtained. Molecules of the polymer having crystallizability that is contained in this stretched film are oriented by the tension applied during the stretching treatment. Therefore, anisotropy of refractive indices nx, ny and nz is caused in the stretched film, and an orientation axis is developed in a width direction that is in the stretching direction. In the scene of industrial production using a stretching device such as a tenter device, a constraint force generally works in directions other than the stretching direction at this time. Therefore, each molecule of the polymer is subjected to not only the tension in the width direction but also the tension in the long side direction. Accordingly, orientation properties in the width direction are relatively weakened. For example, when a primary film which is not stretched and oriented and does not have the value of the Nz factor is stretched at a factor of 2.0 in a width direction using a tenter device, the obtained stretched film tends to have an Nz factor Nz2 of around 1.5.

The specific Nz factor Nz2 of the stretched film is preferably 1.65 or less, more preferably 1.55 or less, and particularly preferably 1.50 or less. When the Nz factor Nz2 of the stretched film is equal to or less than the upper limit value of the aforementioned range, the long-length film having an Nz factor Nz1 close to 1.0 is easily produced. Regarding the lower limit value of the Nz factor Nz2 of the stretched film, when the lower limit value is close to 1.0, the advantage of the present production method which is capability of lowering the Nz factor in the second step to be close to 1.0 can be effectively utilized. However, in order to allow the Nz factor Nz2 of the stretched film to become close to 1.0, the stretching factor is usually required to be made large. When the stretching factor is large, the birefringence Δn of the stretched film becomes large. Accordingly, there is the possibility that the birefringence Δn of the long-length film also becomes large. Such a long-length film having a large birefringence Δn is required to be thinned in order to obtain a long-length film having an appropriate retardation required when used as an optical film. As a result, there is a possibility that the performance of the entire long-length film is decreased by fluctuation in thickness of the long-length film. To address this concern, from the viewpoint of suppressing the excessive increase of the birefringence Δn of the long-length film, the Nz factor Nz2 of the stretched film is preferably 1.20 or more, more preferably 1.25 or more, and particularly preferably 1.30 or more.

When the primary film is subjected to the stretching treatment as previously described, generation of large crystal grains by the heating treatment in the second step can be usually suppressed. Therefore, whitening of the long-length film attributable to crystal grains can be suppressed. Accordingly, transparency of the long-length film can be enhanced.

The thickness of the stretched film may be freely set in accordance with the thickness of the long-length film to be produced, and is preferably 1 μm or more, and more preferably 3 μm or more, and is preferably 100 μm or less, more preferably 50 μm or less, and further preferably 25 μm or less.

<5.3. Second Step: Heating Step>

After the stretched film was obtained in the first step, a second step in which the stretched film is subjected to a heating treatment is performed to obtain the long-length film according to the present invention. When the heating treatment is performed in the second step, crystallization of the crystallizable polymer contained in the stretched film is promoted while the oriented state is maintained. By this promotion of crystallization, the crystallization degree X of the polymer increases. Accordingly, the long-length film according to the present invention is obtained. The heating treatment causes reduction of the Nz factor Nz2 of the stretched film. Thus, a long-length film having an Nz factor Nz1 which is lower than the Nz factor Nz2 of the stretched film before being subjected to the heating treatment may be obtained. Therefore, there may be obtained the long-length film according to the present invention which satisfies the aforementioned (formula 1) to (formula 3) by performing the second step.

The heating temperature of the stretched film in the second step is preferably within a specific temperature range of not lower than the glass transition temperature Tg of the crystallizable polymer contained in the stretched film and not higher than the melting point Tm of the polymer. Accordingly, crystallization of the polymer having crystallizability can be effectively promoted. Furthermore, it is preferable that the temperature is set at a temperature within the aforementioned specific temperature range such that the speed of crystallization increases. For example, when a hydrogenated product of a ring-opening polymer of dicyclopentadiene is used as the polymer having crystallizability, the heating temperature of the stretched film in the second step is preferably 110° C. or higher, and more preferably 120° C. or higher, and is preferably 240° C. or lower, and more preferably 220° C. or lower. When the heating temperature in the second step is equal to or lower than the upper limit of the aforementioned range, opacity of the long-length film is usually effectively suppressed.

The treatment time during which the stretched film is maintained within the aforementioned specific temperature range in the second step is preferably 1 second or more, more preferably 5 seconds or more, and particularly preferably 10 seconds or more, and is preferably 1 hour or less, more preferably 30 minutes or less, and particularly preferably 10 minutes or less. When the treatment time is equal to or more than the lower limit value of the aforementioned range, crystallization of the polymer having crystallizability can be sufficiently promoted. Therefore, optical properties such as the Nz factor can be easily confined within a desired range. When the treatment time is equal to or less than the upper limit value of the aforementioned range, opacity of the long-length film attributable to the heating treatment can be effectively suppressed.

By the aforementioned heating treatment, the Nz factor Nz2 of the stretched film becomes small, and thereby a long-length film having an Nz factor Nz1 close to 1.0 may be obtained. Therefore, the Nz factor Nz1 of the long-length film is usually smaller than the Nz factor Nz2 of the stretched film. A difference ΔNz (=Nz2−Nz1) between the Nz factor Nz2 of the stretched film and the Nz factor Nz1 of the long-length film at this time satisfies the following (formula 4):

$$0.05 \leq \Delta Nz \leq 0.5 \qquad \text{(formula 4)}.$$

More specifically, the aforementioned difference ΔNz in the Nz factor is usually 0.05 or more, preferably 0.08 or more, and more preferably 0.10 or more, and is usually 0.5 or less, preferably 0.45 or less, and more preferably 0.40 or less. When the difference ΔNz in the Nz factor is equal to or more than the lower limit value of the aforementioned range, the Nz factor Nz2 of the stretched film does not need to be a value close to 1.0, and the primary film does not need to be stretched in a width direction at a high stretching factor. Therefore, the birefringence Δn of the long-length film after having been subjected to the heating treatment can be easily controlled within a desired range. When the difference ΔNz in the Nz factor is equal to or less than the upper limit value of the aforementioned range, excessively large size changes of the film during the heating treatment can be suppressed. Therefore, break of a film and generation of wrinkles can be effectively suppressed.

It is preferable that the heating device for heating the stretched film is a heating device which can increase the atmospheric temperature around the stretched film as therewith a physical contact between the heating device and the stretched film is unnecessary. Specific examples of the suitable heating device may include an oven and a heating furnace.

In the second step, the heating treatment of the stretched film is preferably performed in a state in which at least two sides of the stretched film are held so that the stretched film is strained. Here, the state in which the stretched film is strained refers to a state in which tension is applied to the stretched film. However, the state in which the stretched film is strained does not include a state in which the stretched film is substantially stretched. Being substantially stretched usually refers to the stretching wherein the stretching factor in any one direction of the stretched film becomes 1.1 times or more.

By subjecting the stretched film in a state in which at least two sides thereof are held and strained to the heating treatment, the stretched film can be prevented from deforming due to thermal shrinkage in the region between the held sides. At this time, for preventing deformation in a wide area of the stretched film, it is preferable to hold sides including opposing two sides so that the region between the held sides becomes in a strained state. Specifically with the long-length stretched film, it is preferable that two sides at ends in the width direction (that is, two long sides) are held to keep the region between the two sides in a strained state, to thereby prevent deformation in the entire surface of the long-length stretched film. In the stretched film which is prevented from deforming in this manner, occurrence of deformation such as wrinkles can be suppressed even when stress is generated in the film due to thermal shrinkage. Therefore, the long-length film can be prevented from losing its flatness due to the heating treatment. Thus, there can be obtained a flat long-length film in which waviness and wrinkles are reduced.

When the stretched film is held, a side of the stretched film may be held with an adequate holder. The holder may be a holder that is capable of continuously holding the entire length of the side of the stretched film. Alternatively, the holder may be a holder that is capable of holding the side of the stretched film uncontinuously with intervals. For example, the side of the stretched film may be held uncontinuously with holders disposed with specific intervals.

The holder is preferably a holder that is not brought into contact with the stretched film at portions other than the sides of the stretched film. With use of such a holder, a long-length film having more excellent flatness can be obtained.

Furthermore, the holders are preferably holders the relative position among which is capable of being be fixed in the second step. With such holders, the relative position among the holders does not move in the second step. Accordingly, substantial stretching of the stretched film during the heating treatment can be easily suppressed.

Examples of a suitable holder for holding two sides at the ends in the width direction of the long-length stretched film may include a gripper which is provided to a tenter stretching machine and is capable of gripping the side of the stretched film.

The holder may hold a side at the end in the lengthwise direction of the long-length stretched film (that is, a short side), or may hold, instead of the short side, both sides in the lengthwise direction of the region to be heated to a specific temperature range of the stretched film. For example, there may be provided a holding device which is capable of holding and straining the stretched film at both sides in the lengthwise direction in the region to be heated to a specific temperature range so that the stretched film does not thermally shrink. Examples of such a holding device may include a combination of two rolls. By the combination, tension such as conveyance tension may be applied to the stretched film, and thereby the thermal shrinkage of the stretched film can be suppressed in the region to be heated to a specific temperature range. Therefore, when the combination is used as a holding device, the stretched film can be held while being conveyed in the lengthwise direction. Thus, the long-length film can be efficiently produced.

<5.4. Optional Step>

The aforementioned method for producing the long-length film may include an optional step in combination with the first step and the second step. For example, the aforementioned production method may include a step of stretching the primary film in the width direction, prior to the first step. As another example, the aforementioned production method may include a step of subjecting the long-length film to an optional surface treatment.

[6. Applications of Long-Length Film]

The long-length film according to the present invention may be used for any application, and is preferably used as, among others, an optical film such as an optical compensation film, a phase difference film, and a polarizing plate protective film.

EXAMPLES

Hereinafter, the present invention will be specifically described by illustrating Examples. However, the present invention is not limited to the Examples described below. The present invention may be freely modified for implementation without departing from the scope of claims of the present invention and its equivalents.

Unless otherwise stated, "%" and "part" representing quantities in the following description are on the basis of weight. Unless otherwise stated, the operation in the following was performed under the conditions of normal temperature and normal pressure.

<Method for Measuring Weight-Average Molecular Weight and Number-Average Molecular Weight>

The weight-average molecular weight and the number-average molecular weight of the polymer were measured as a polystyrene equivalent value using a gel•permeation•chromatography (GPC) system ("HLC-8320" manufactured by Tosoh Corporation). In the measurement, an H-type column (manufactured by Tosoh Corporation) was used as a column, and tetrahydrofuran was used as a solvent. The temperature during the measurement was 40° C.

<Method for Measuring Glass Transition Temperature Tg and Melting Point Tm>

A sample was heated under nitrogen atmosphere at 300° C., and quenched with liquid nitrogen. The temperature was increased using a differential scanning calorimeter (DSC) at 10° C./min, and the glass transition temperature Tg and the melting point Tm were obtained.

<Method for Measuring Hydrogenation Rate of Polymer>

The hydrogenation rate of the polymer was measured by a $^1$H-NMR measurement at 145° C. with ortho-dichlorobenzene-$d^4$ as a solvent.

<Method for Measuring Ratio of Racemo•Diad of Polymer>

The $^{13}$C-NMR measurement of the polymer was performed by applying an inverse-gated decoupling method at 150° C. with ortho-dichlorobenzene-$d^4$ as a solvent. From the result of this $^{13}$C-NMR measurement, a signal at 43.35 ppm derived from a meso•diad and a signal at 43.43 ppm derived from a racemo•diad were identified with a peak at 127.5 ppm of ortho-dichlorobenzene-$d^4$ as a reference shift, and the ratio of a racemo•diad of the polymer was calculated on the basis of the intensity ratio thereof.

<Method for Measuring Crystallization Degree of Polymer>

The crystallization degree of the polymer contained in the film was measured by an X-ray diffraction method.

<Method for Measuring Nz factor, Birefringence Δn, and Orientation Axis Direction of Film>

From a film to be evaluated, a test piece having a width of 100 mm and a length of 50 mm was cut out. This test piece was measured for an in-plane direction retardation Re (unit: nm), a thickness direction retardation Rth (unit: nm), a slow axis direction, and refractive indices nx, ny, and nz, at a measurement wavelength of 590 nm, using "AxoScan" manufactured by Axometrics Co., Ltd. From the measured retardations Re and Rth, an Nz factor (=Rth/Re+0.5) was calculated. From the measured indices nx and ny, the birefringence Δn (=nx−ny) of the film was calculated.

<Method for Evaluating Light Leakage of Film>

On a surface light source, a linear polarizing plate, a phase difference film (in-plane direction retardation Re=60 nm, thickness direction retardation Rth=−90 nm), a sample film to be evaluated, and a linear polarizing plate were placed on one another in this order to prepare an evaluation sample. At this time, the two linear polarizing plates were disposed in a crossed Nichol relationship. The slow axis of the phase difference film and the slow axis of the sample film were disposed in parallel with the absorption axis of the linear polarizing plate on the surface light source side.

Thereafter, the evaluation sample was observed at a depression angle of 40° from the direction of 45° relative to the absorption axis of the linear polarizing plate on the surface light source side, while the surface light source was turned on. When light did not leak, and appearance was dark as a result of the observation, the sample was evaluated as "Good". When light somewhat leaked, the sampe was evaluated as "Unacceptable". Furthermore, when light considerably leaked, the sample was evaluated as "Failure".

<Method for Evaluating Water Absorption>

From a film to be evaluated, a test piece having a width of 100 mm and a length of 100 mm was cut out. The weight of the test piece was measured. Thereafter, this test piece was immersed in water at 23° C. for 24 hours, and the weight of the immersed test piece was measured. Then, the ratio of the weight increase of the test piece by the immersion relative to the weight of the test piece before the immersion was calculated as a water absorption (%). When the water absorption was 0.1% or less, the sample was evaluated as "Good". When more than 0.1%, the sample was evaluated as "Failure".

Production Example 1. Production of Hydrogenated Product of Ring-Opening Polymer of Dicyclopentadiene A metal pressure-resistant reaction vessel was sufficiently dried. Thereafter, the atmosphere in the vessel was substituted with nitrogen. In this metal pressure-resistant reaction vessel, there were placed 154.5 parts of cyclohexane, 42.8 parts (30 parts as the amount of dicyclopentadiene) of a 70% cyclohexane solution of dicyclopentadiene (endo form content: 99% or more), and 1.9 parts of 1-hexene. This mixture was heated to 53° C.

Into a solution containing 0.014 parts of a tetrachlorotungsten phenylimide (tetrahydrofuran) complex dissolved in 0.70 parts of toluene, 0.061 parts of a diethylaluminum ethoxide/n-hexane solution with a concentration of 19% was added. The mixture was stirred for 10 minutes to prepare a catalyst solution.

This catalyst solution was added into the pressure resistant reaction vessel to initiate a ring-opening polymerization reaction. Thereafter, the reaction proceeded for 4 hours while 53° C. was maintained. Thus, a solution of a ring-opening polymer of dicyclopentadiene was obtained.

The number-average molecular weight (Mn) and the weight-average molecular weight (Mw) of the obtained ring-opening polymer of dicyclopentadiene were 8,750 and 28,100, respectively. The molecular weight distribution (Mw/Mn) calculated from these values was 3.21.

Into 200 parts of a solution of the obtained ring-opening polymer of dicyclopentadiene, 0.037 parts of 1,2-ethanediol was added as a terminator. The product was heated to 60° C. and stirred for 1 hour to terminate the polymerization reaction. To the resultant product, 1 part of a hydrotalcite-like compound ("Kyoward (registered trademark) 2000" manufactured by Kyowa Chemical Industry Co., Ltd.) was added. The mixture was heated to 60° C., and stirred for 1 hour. Thereafter, to the obtained product, 0.4 parts of a filter aid ("Radiolite (registered trademark) #1500" manufactured by Showa Chemical Industry Co., Ltd.) was added, and the adsorbent and the solution were separated by filtration using a PP pleated cartridge filter ("TCP-HX" manufactured by Advantec Toyo Kaisha Ltd.).

Into 200 parts (polymer amount: 30 parts) of the filtered solution of the ring-opening polymer of dicyclopentadiene, 100 parts of cyclohexane was added. Then, 0.0043 part of chlorohydridocarbonyltris(triphenylphosphine)ruthenium was added. The mixture was subjected to a hydrogenation reaction at a hydrogen pressure of 6 MPa and a temperature of 180° C. for 4 hours. As a result, a reaction liquid containing a hydrogenated product of the ring-opening polymer of dicyclopentadiene was obtained. The hydrogenated product was deposited in the reaction liquid, and this reaction liquid was in a form of a slurry solution.

The hydrogenated product contained in the reaction liquid was separated from the solution using a centrifuge, and dried under reduced pressure at 60° C. for 24 hours. Thus, 28.5 parts of a crystallizable hydrogenated product of the ring-opening polymer of dicyclopentadiene was obtained. This hydrogenated product had a hydrogenation rate of 99% or more, a glass transition temperature (Tg) of 95° C., a melting point (Tm) of 262° C., and a racemo•diad ratio of 89%.

Example 1

(1-1. Production of Primary Film)

To 100 parts of the hydrogenated product of the ring-opening polymer of dicyclopentadiene obtained in Production Example 1, 1.1 parts of an antioxidant (tetrakis[methylene-3-(3',5'-di-t-butyl-4'-hydroxyphenyl)propionate]methane; "Irganox (registered trademark) 1010" manufactured by BASF Japan Ltd.) was mixed, to obtain a resin that serves as a material of a film.

The obtained resin was poured into a biaxial extruder provided with four die holes each having an inner diameter of 3 mm. With the biaxial extruder, the resin was molded into a strand-shape molded body by hot melt extrusion molding. This molded body was shredded with a strand cutter thereby to obtain pellets of the resin. The operation conditions of the aforementioned biaxial extruder were as follows:

Barrel preset temperature: 270° C. to 280° C.
Die preset temperature: 250° C.
Screw revolutions: 145 rpm
Feeder revolutions: 50 rpm.

Subsequently, the obtained pellets were supplied to a hot-melt extrusion film-molding machine equipped with a T die. With this film-molding machine, a long-length primary film (thickness: 22 μm) formed of the aforementioned resin was produced by a method of winding up into a roll at a rate of 2 m/min. The operation conditions of the aforementioned film-molding machine were as follows:

Barrel temperature setting: 280° C. to 290° C.
Die temperature: 270° C.
Screw revolutions: 30 rpm.

(1-2. Stretching Treatment (First Step))

A tenter stretching machine equipped with clips capable of gripping two sides at the ends in the width direction of the long-length primary film was prepared. The long-length primary film was supplied to the aforementioned tenter stretching machine. Two sides at the ends in the width direction of the primary film were held and pulled by the clips in the width direction, to thereby subject the primary film to a uniaxial stretching treatment. The stretching conditions at this time were a stretching temperature of 120° C. and a stretching factor of 2.4 times. Accordingly, a stretched film was obtained. The end portions gripped by the clips were cut off from part of the obtained stretched film. As to the remained portion, the Nz factor and the crystallization degree of the polymer were measured by the aforementioned methods.

(1-3. Heating Treatment (Second Step))

The stretched film was subjected to a heating treatment while conveyed in a state in which two sides at the ends in the width direction of the stretched film were held and strained by the clips of the tenter device. The heating conditions at this time were a treatment temperature of 200° C. and a treatment time of 1 minute. Accordingly, crystallization of the alicyclic structure-containing polymer contained in the stretched film proceeded. Thus, a long-length film having a thickness of 9 μm was obtained.

The end portions gripped by the clips were cut off from the obtained long-length film. As to the remained portion, the Nz factor, the birefringence, the direction of a slow axis, and the crystallization degree and water absorption of a polymer were measured by the aforementioned methods. Since the measured slow axis was perpendicular to the long side direction of the long-length film, it was confirmed that the orientation axis of the produced long-length film was perpendicular to the lengthwise direction of the long-length film. The measured water absorption was 0.01% or less.

Example 2

In the step (1-1), the thickness of the primary film was changed to 12 μm. In the step (1-2), the stretching temperature was changed to 110° C. A long-length film was produced and evaluated in the same manner as that in Example 1 except for the aforementioned matters. The measured water absorption was 0.01% or less.

Comparative Example 1

In the step (1-3), the treatment temperature in the heating treatment was changed to 140° C. A long-length film was produced and evaluated in the same manner as that in Example 2 except for the aforementioned matter. The measured water absorption was 0.01% or less.

Comparative Example 2

In the step (1-1), a cyclic olefin resin containing a cyclic olefin polymer having no crystallizability ("ZEONOR" manufactured by ZEON Corporation, glass transition temperature: 120° C.) was used as a resin which serves as a material of a primary film. In the step (1-2), the stretching temperature was changed to 140° C. Furthermore, the heating treatment like the step (1-3) was not performed. A stretched film was produced and evaluated in the same manner as that in Example 1 except for the aforementioned matters. The measured water absorption was 0.01% or less.

Comparative Example 3

In the step (1-1), a polycarbonate resin containing polycarbonate having no crystallizability ("Wonderlite PC-115" manufactured by Asahi Kasei Corp., glass transition temperature 145° C.) was used as a resin which serves as a material of a primary film. In the step (1-2), the stretching temperature and the stretching factor were changed to 150° C. and 2.7 times, respectively. Furthermore, the heating treatment like the step (1-3) was not performed. A stretched film was produced and evaluated in the same manner as that in Example 1 except for the aforementioned matters. The measured water absorption was 0.24%.

[Results]

The results of the aforementioned Examples and Comparative Examples are shown in the following Table 1. In the following Table 1, abbreviations mean as follows:

Poly-DCPD: hydrogenated product of ring-opening polymer of dicyclopentadiene, having crystallizability ZNR: cyclic olefin resin containing cyclic olefin polymer having no crystallizability PC: polycarbonate resin containing polycarbonate having no crystallizability.

TABLE 1

[Results of Examples and Comparative Examples]

| | | Ex. 1 | Ex. 2 | Comp. Ex. 1 | Comp. Ex. 2 | Comp. Ex. 3 |
|---|---|---|---|---|---|---|
| Primary film | Material | Poly-DCPD | Poly-DCPD | Poly-DCPD | ZNR | PC |
| | Film thickness (μm) | 22 | 12 | 12 | 22 | 22 |
| Stretching conditions | Stretching mode | Tenter | Tenter | Tenter | Tenter | Tenter |
| | Stretching temperature (° C.) | 120 | 110 | 110 | 140 | 150 |
| | Stretching factor | 2.4 | 2.4 | 2.4 | 2.4 | 2.7 |
| Stretched film | Crystallization degree (%) | 4 | 4 | 4 | 0 | 0 |
| | Nz factor | 1.49 | 1.26 | 1.26 | 1.40 | 1.37 |
| Heating conditions | Temperature (° C.) | 200 | 200 | 140 | — | — |
| | Time (minute) | 1 | 1 | 1 | — | — |
| Long-length film | Crystallization degree (%) | 28 | 30 | 13 | — | — |
| | Nz factor | 1.12 | 1.07 | 1.18 | — | — |
| | Film thickness (μm) | 9 | 5 | 5 | — | — |
| | Birefringence | 0.0139 | 0.0239 | 0.0100 | — | — |
| | Water absorption (%) | Good | Good | Good | Good | Failure |
| | Light leakage evaluation | Good | Good | Unacceptable | Failure | Failure |

[Discussion]

In Examples 1 and 2, the stretched film was subjected to the heating treatment to thereby decrease the Nz factor of the stretched film. Consequently, a long-length film having an Nz factor close to 1.0 was obtained. As this long-length film has suitable optical properties such as birefringence and Nz factors, favorable results were obtained in the evaluation for light leakage. From these results, it was confirmed that a favorable optical film can be achieved according to the present invention.

The invention claimed is:

1. A long-length film formed of a resin containing a polymer having crystallizability, wherein
   the long-length film has an orientation axis perpendicular to a long side direction of the long-length film,
   the long-length film has an Nz factor Nz1 satisfying (formula 1),
   the long-length film has a birefringence Δn satisfying (formula 2), and
   the polymer has a crystallization degree X satisfying (formula 3):

$1.0 \leq Nz1 \leq 1.15$ (formula 1)

$0.01 \leq \Delta n \leq 0.1$ (formula 2)

$15\% \leq X$ (formula 3), wherein the birefringence Δn is a value represented by "$\Delta n = nx - ny$",
   nx represents a refractive index in a direction that gives the largest refractive index among in-plane directions, and
   ny represents a refractive index in a direction that is perpendicular to the direction of nx among the in-plane directions.

2. The long-length film according to claim 1, wherein the resin has a water absorption of 0.1% or less.

3. The long-length film according to claim 1, wherein the polymer is an alicyclic structure-containing polymer.

4. The long-length film according to claim 1, wherein the long-length film has a thickness of 1 μm or more and 100 μm or less.

5. A method for producing a long-length film, comprising:
   a first step of subjecting a long-length primary film formed of a resin containing a polymer having crystallizability to a stretching treatment in a width direction to obtain a stretched film having an Nz factor of Nz2; and
   a second step of subjecting the stretched film obtained in the first step to a heating treatment to obtain a long-length film having an Nz factor of Nz1, wherein
   a difference ΔNz between the Nz factor Nz2 of the stretched film and the Nz factor Nz1 of the long-length film satisfies (formula 4),
   the Nz factor Nz1 of the long-length film satisfies (formula 1),
   the long-length film has a birefringence Δn satisfying (formula 2), and
   the polymer contained in the long-length film has a crystallization degree X satisfying (formula 3):

$0.05 \leq \Delta Nz \leq 0.5$ (formula 4)

$1.0 \leq Nz1 \leq 1.15$ (formula 1)

$0.01 \leq \Delta n \leq 0.1$ (formula 2)

$15\% \leq X$ (formula 3), wherein the birefringence Δn is a value represented by "$\Delta n = nx - ny$",
   nx represents a refractive index in a direction that gives the largest refractive index among in-plane directions, and
   ny represents a refractive index in a direction that is perpendicular to the direction of nx among the in-plane directions.

* * * * *